United States Patent [19]

Wendorf et al.

[11] Patent Number: 5,488,706
[45] Date of Patent: Jan. 30, 1996

[54] RETRY REQUEST SYSTEM IN A PIPELINE DATA PROCESSING SYSTEM WHERE EACH REQUESTING UNIT PRESERVES THE ORDER OF REQUESTS

[75] Inventors: Kent Wendorf, San Jose; Ronald N. Hilton, Cupertino; Nicholas Y. Pang, San Mateo; Jeffrey L. Baker; Kham X. Nguyen, both of Milpitas, all of Calif.

[73] Assignee: Amdahl Corporation, Sunnyvale, Calif.

[21] Appl. No.: 993,082

[22] Filed: Dec. 18, 1992

[51] Int. Cl.$^6$ .................................. G06F 9/30; G06F 9/28
[52] U.S. Cl. .................... 395/375; 395/800; 395/182.21; 364/231.8; 364/262.4; 364/262.9; 364/DIG. 1
[58] Field of Search ...................................... 395/375, 800, 395/725, 325, 425; 371/12

[56] References Cited

U.S. PATENT DOCUMENTS

| | | | |
|---|---|---|---|
| 4,782,441 | 11/1988 | Inagami et al. | 395/800 |
| 4,875,160 | 10/1989 | Brown, III | 395/375 |
| 4,912,707 | 3/1990 | Kogge et al. | 371/12 |
| 4,924,466 | 5/1990 | Gregor et al. | 371/12 |
| 4,991,090 | 2/1991 | Emma et al. | 395/575 |
| 5,006,982 | 4/1991 | Ebersole et al. | 395/325 |
| 5,050,066 | 9/1991 | Myers et al. | 395/575 |
| 5,075,844 | 12/1991 | Jardine et al. | 395/375 |
| 5,222,219 | 6/1993 | Stumpf et al. | 395/325 |
| 5,222,223 | 6/1993 | Webb, Jr. et al. | 395/425 |
| 5,226,126 | 7/1993 | McFarland et al. | 395/375 |
| 5,247,628 | 9/1993 | Grohoski | 395/375 |
| 5,257,354 | 10/1993 | Comfort et al. | 395/375 |

*Primary Examiner*—Krisna Lim
*Attorney, Agent, or Firm*—Fliesler, Dubb, Meyer & Lovejoy

[57] ABSTRACT

An interface between a storage unit and a system control unit maintains a sequential processing when retrying linestores by providing a single piece of information that the linestore is a "first" in a series. An initial request flag accompanies linestore requests to the system controller and is returned to the storage unit with linestore replies. A mode indicator coupled with the storage unit pipeline sets a retry mode latch in response to a linestore restart reply, and resets the retry mode latch in response to a linestore read reply by the system controller to an initial request. Logic in the pipeline suppresses requests for the system resource in the pipeline, other than initial requests, when the retry mode latch is set, such as by flagging data subject of the second flow as locked or otherwise invalid. The port includes a state machine which preserves the order of pending requests for the system resource.

11 Claims, 7 Drawing Sheets

FIG.—7

800 SU LS SEND     PATBR
801 IBUS GRANT
802 REQ IN SC PORT
803 DI: SEARCH
804    SHORT MO              PATBR
805 MOQ SEARCH
806 MOS: LS READ FLOW
807    LOAD SWAP BUFFER (1 QW)                PATBR
808 MRS: NO OP
809 MIS: NO OP
810 MOQAS: ADD LS DATA TO MOQ
811 TC: TRANSFER DATA TO MSDIR
812    REQUEST MS WRITE

FIG.–8

RETRY REQUEST SYSTEM IN A PIPELINE DATA PROCESSING SYSTEM WHERE EACH REQUESTING UNIT PRESERVES THE ORDER OF REQUESTS

BACKGROUND OF THE INVENTION

1. Field of the Invention

The present invention relates to retry operations in data processing systems having at least one pipelined unit which issues and retries a request for a system resource outside of the pipeline. In particular, the present invention applies to large scale data processing systems having a pipelined storage unit which issues linestore requests to a main storage unit, and which must preserve the order of linestore requests even when a retry is necessary.

2. Description of Related Art

Data processing systems executing IBM 370 class instructions use a MOVE LONG instruction to clear a block of mainstore, since hardware can reduce the number of data transfers required to store a "clear" to an entire line. The operation involves sending a "pad byte", such as all zeros, to the main storage system, which is stored repeatedly to multiple bytes in the line of data. The storage unit issuing this type of request, called a linestore request herein, sends the pad byte to mainstore once per line.

Occasionally, a request to store a line in this manner issued by the storage unit will be unable to complete. For instance, the system controller managing a mainstore interface may discover that data in the line is being used by a CPU, and prevent overwriting it by the linestore operation. In this case, the system controller must issue a signal to the storage unit to retry the linestore request later. In a retry situation, it is important to maintain the order of linestores pending in store ports of the storage unit to preserve the integrity of the data being written. Prior art systems use the identification of the port from which the linestore request was issued, as a means of keeping track of the order of the linestore. Thus, a store port ID is sent with each linestore request from the storage unit to the system controller, and the store port ID is returned to the storage unit from the system controller with the linestore retry response. The system controller then must suppress all other linestores from other store ports until the retry is successful. Transferring of the store port ID in this manner uses costly input/output resources between the system controller and the storage unit, which multiplies as the number of CPUs and storage units served by a given system controller are increased.

In addition, when a linestore request is denied, and a retry signal is sent, cancel hardware must be implemented in both the storage unit and the system controller to force the sequential processing of linestores by cancelling out-of-order stores left over after a linestore retry signal.

It is desirable to provide an interface between a storage unit issuing linestore requests, and a system controller, which is less costly of I/O resources, and simplifies the hardware for preserving order.

SUMMARY OF THE INVENTION

The present invention provides an interface between a storage unit and a system control unit which maintains a sequential processing of linestores by providing a single piece of information that the linestore is a "first" in a series. For the purpose of this application, this piece of information is referred to as the initial request flag. The initial request flag accompanies linestore requests to the system controller and is returned to the storage unit with linestore read and restart responses. Although the initial request flag could be conveyed using a wire on the interface, the preferred embodiment uses two opcodes for the linestore requests, one for an initial linestore request, one for a linestore request which is not an initial request. Also, two opcodes are used for read responses from the system control unit, one in response to an initial request, and one in response to other requests. In this manner, the opcode decoding logic in the system controller and the storage unit detects initial requests and responds appropriately.

In a data processing system having a pipeline issuing requests for a system resource in order using a first pipeline flow, and wherein the system resource replies to a successful request with a reply using a second pipeline flow to satisfy the request, and replies to a failed request with a restart flow, the invention can be characterized as an apparatus preserving the order of requests when a failed request is retried. The apparatus comprises a port for supplying requests to the pipeline in order. Flag logic is included for flagging a request as an initial request, if no pending requests remain in the pipeline or awaiting a response from the system resource. A mode indicator coupled with the pipeline sets a retry mode latch in response to a restart flow, and resets the retry mode latch in response to a reply to an initial request. Logic in the pipeline suppresses replies from the system resource in the pipeline, other than initial requests, when the retry mode latch is set, such as by flagging data subject of the second pipeline flow as locked or otherwise invalid.

The port includes a state machine which preserves the order of pending requests for the system resource. The restart flow causes the state machine to re-send the requests, beginning with the failed request. The flag logic is based on the use of separate opcodes for initial requests, and replies to initial requests, as described above.

According to one aspect of the invention, the system resource is a mainstore served by a system controller (SC), and the pipeline is a storage unit pipeline coupled to an instruction unit that requests the storage unit (SU) to issue a linestore request. A series of linestores begins with a request from the instruction unit which loads a store port. After the store port holding this first linestore becomes top-of-queue (TOQ), a linestore init request is issued to the SC. The SU sends the init-flag with a linestore request if there are no other outstanding linestore requests to the SC, as indicated by the state machines associated with each store port. Sending the init-flag on the first linestore in a series in this manner assures that the linestore retry mode latch will be initialized in the inactive state in the flow responsive to the initial reply.

The SU linestore retry mode latch is set when the SC sends a linestore restart, with or without the init-flag active. When active, the linestore retry mode latch indicates that the serial processing of linestores was disturbed, due to the line being locked by another processor or other reasons, and that subsequent linestore reads from the system controller must be cancelled to prevent out of order storing.

Upon entering linestore retry mode, the SU re-sends the failed linestore request in response to the restart reply opcode. The TOQ linestore is now "first" in a series since the previous series was broken and the store port state machines have been reset to the initial linestore state. The SU issues a linestore init request to the SC. In the meantime, all linestore reads from the SC are cancelled by the SU by signalling "line locked" in response to the retry mode latch.

If the SC discovers that the requested line is still locked, a linestore restart-init is returned. The linestore retry mode latch is set again (although previously set) and events continue as previously described until the SC finds that the requested TOQ linestore, which is indicated by the linestore init opcode, is no longer locked. The SC responds with a linestore read-init.

The linestore read-init from the SC resets the SU linestore retry mode latch and allows the sequential processing of linestores to resume.

Other aspects and advantages of the present invention can be seen upon review of the figures, the detailed description, and the claims which follow.

BRIEF DESCRIPTION OF THE FIGURES

FIG. 8 is a pipeline flow diagram from the perspective of the system controller.

DESCRIPTION OF THE PREFERRED EMBODIMENTS

Figure 1:
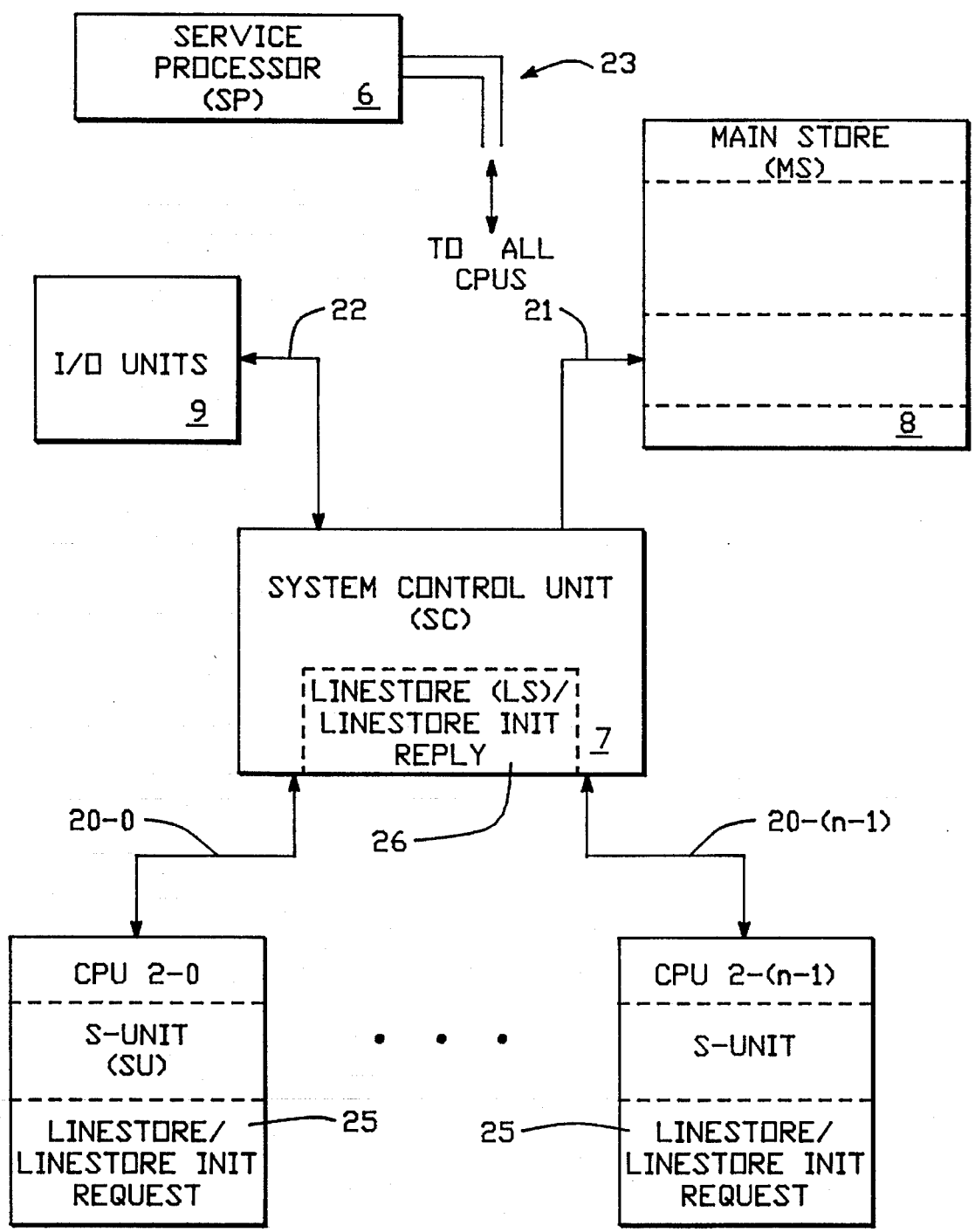
FIG. 1 is an overview block diagram of a data processing system incorporating the present invention.
Figure 2:
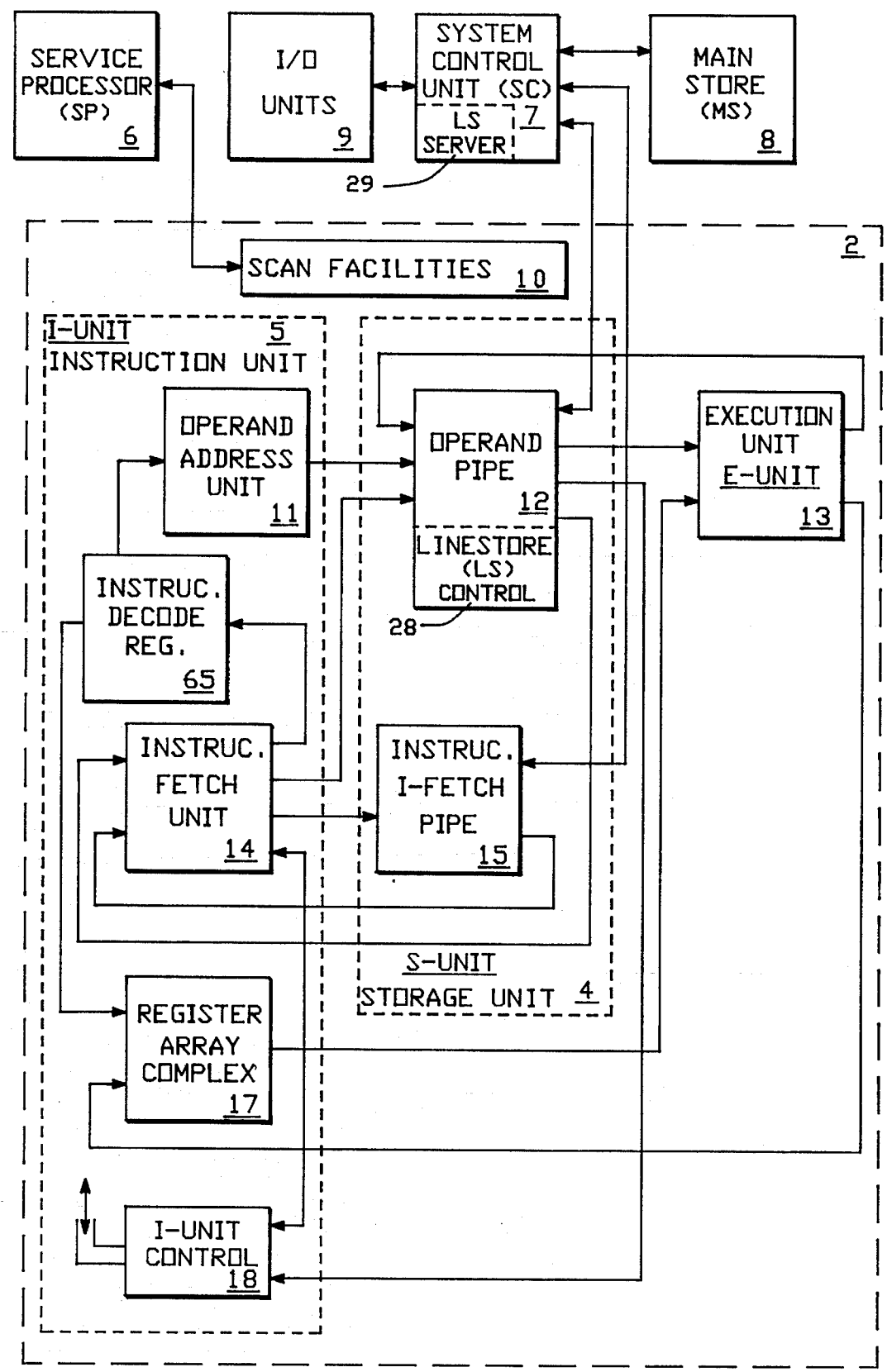
FIG. 2 is a block diagram of a CPU with a storage unit having linestore control according to the present invention.

A detailed description of the preferred embodiments of the present invention is provided with respect to the figures. FIGS. 1 and 2 provide a system overview. FIGS. 3-7 are used to provided detailed description of a preferred implementation.

Computer System Overview—FIGS. 1 and 2

FIG. 1 illustrates a multi-CPU computer system according to the present invention. The computer system includes a plurality of central processing units, each having a storage unit with a store-to cache. Thus, CPUs (0) through CPU (n-1) are given reference numbers 2-0 through 2-(n-1). Each of the CPUs is coupled to a system control unit 7 across interfaces 20-0 through 20-(n-1). The system control unit 7 also includes a mainstore interface 21. The system control unit 7 controls access to data among the CPUs and mainstore 8. Also coupled to the system control unit 7 through interface 22 are the input/output units 9. A service processor 6 is coupled to all of the functional units of the computer system, as indicated by arrows 23 through a scan interface or otherwise as known in the art.

As indicated in the figure, each of the CPUs, CPU-0 through CPU-n-1 includes an individual storage unit (S UNIT). Each storage unit includes an operand store-to cache and an instruction cache. Also, the storage unit is responsible for issuing requests for system controller services including logic 25 for linestore requests and initial linestore requests. The system control unit 7 in turn includes logic 26 for replying to linestore requests and initial linestore requests.

FIG. 2 provides a more detailed diagram of a CPU 2 according to the present invention. The CPU 2, as illustrated in FIG. 1, is coupled to the system control unit 7 which includes linestore reply server 29. The system control unit 7 is ill turn coupled to the mainstore 8 and the I/O units 9. Service processor 6 is coupled to the CPU 2 with scan-in and scan-out facilities 10.

The CPU 2 includes an instruction unit 5 (I UNIT), a storage unit 4 (S UNIT), and an execution unit 13 (E UNIT). The I UNIT 5 includes an instruction decode register 65 (IDR) which supplies input to an operand address unit 11. Also, the IDR 65 supplies input to register array complex 17. The input to the IDR 65 is provided by an instruction fetch unit 14 (I FETCH UNIT). I UNIT control 18 controls the operation of the functional blocks of the I UNIT 5 and includes explicit connections to the I FETCH UNIT 14 and the S UNIT operand pipe 12 (SUOP PIPE).

The S UNIT 4 includes a storage unit operand pipe 12 and a storage unit I FETCH pipe 15. Coupled to the operand pipe 12 is an associatively addressed operand cache. Similarly, coupled to the I FETCH pipe 15 is an associatively addressed instruction cache. The S UNIT operand pipe 12 is addressed from the output of the operand address unit 11 and the I FETCH UNIT 14. Linestore request logic 28 (LS) is included in the operand pipeline 12. The S UNIT I FETCH pipe 15 receives its addresses from the I FETCH UNIT 14.

The S UNIT operand pipe 12 supplies data to the E UNIT 13, the I UNIT control 18, and the I FETCH UNIT 14. The S UNIT I FETCH pipe 15 provides data to the I FETCH UNIT 14. Both the S UNIT I FETCH pipe 15 and the S UNIT operand pipe 12 are coupled to the system control units 7, through which access to the mainstore 8 is provided and data integrity operations are accomplished to insure cache consistency with other CPUs in the system.

The E UNIT 13 provides resulting data, including "pad bytes" in linestore operations, to the S UNIT operand pipe 12 and to the register array complex 17.

The overall computer system as described in FIGS. 1 and 2 operates in accordance with the IBM ESA/390 or ESA/370 architecture and is further compatible with the Amdahl 5995-M computer.

II. The Storage Unit and System Controller Structure (FIGS. 3 and 4)

Figure 3:
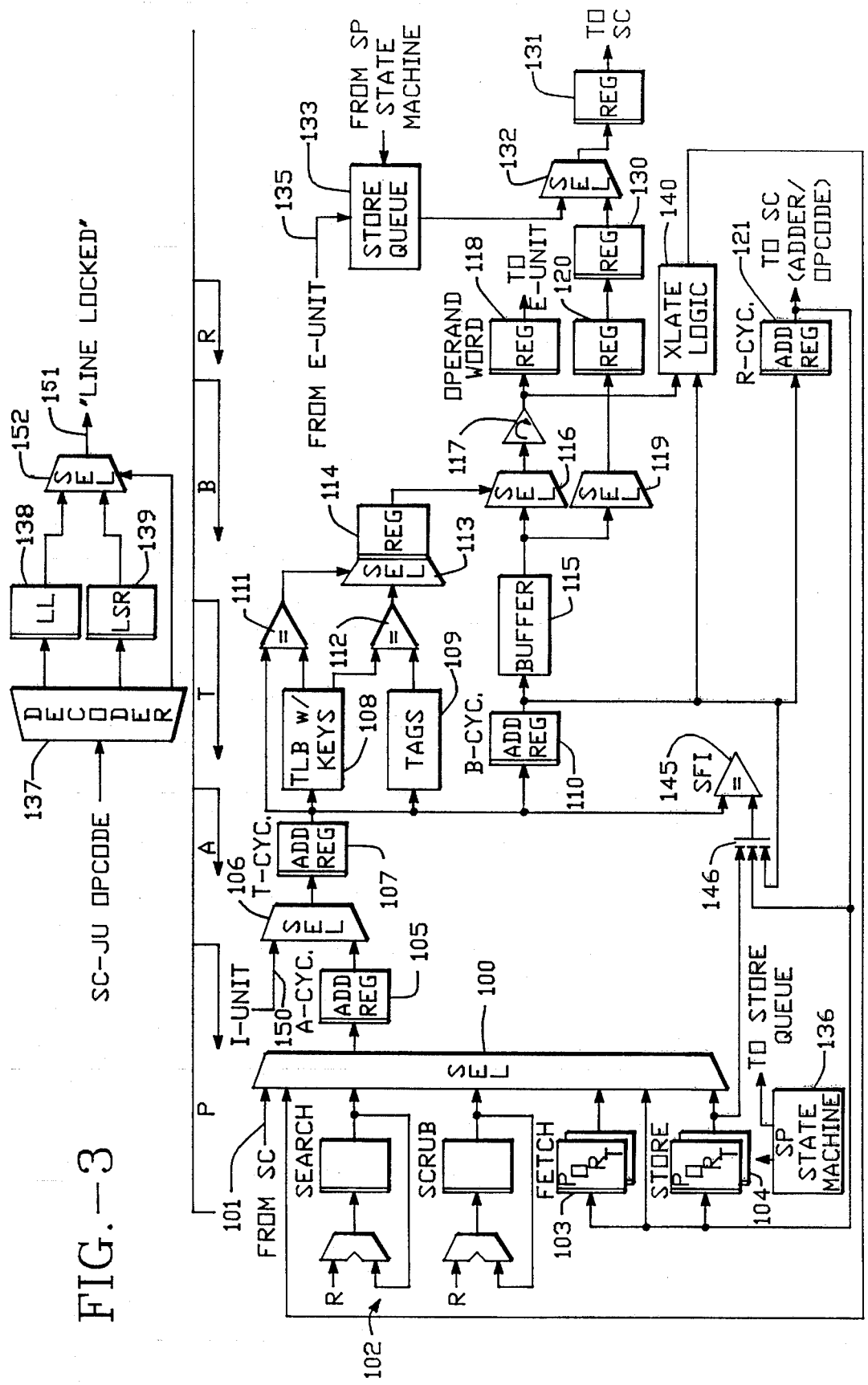
FIG. 3 is a schematic diagram of the storage unit pipeline for the CPU of FIG. 2.
Figure 4:
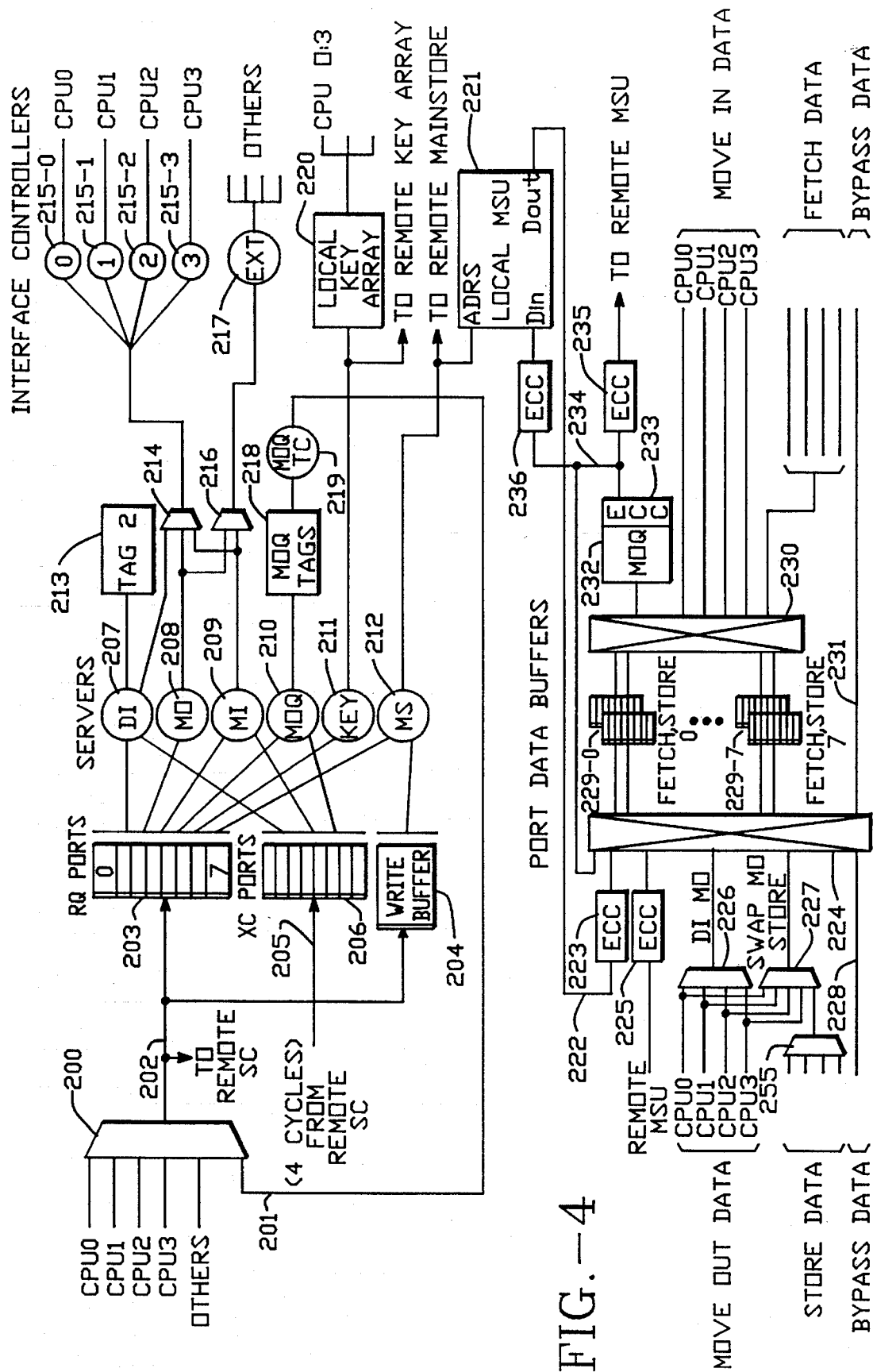
FIG. 4 is a schematic diagram of a system controller in a system according to the present invention.

FIG. 3 is a simplified functional diagram illustrating control of the S UNIT operand pipe. The system includes priority logic 100 receiving a plurality of requests for access to the cache. The inputs to the priority logic 100 include requests from the system controller (SC) 7 via line 101, and other requests, generally 102, for processes needing access to data in the cache, such as fetch ports 103 (FP), store ports 104 (SP), and logical-to-physical translator (XLATE) logic 140. The output of the priority logic 100 is supplied to an address register 105 (ALAR). The address register 105 supplies its output to a second level of priority logic 106. The instruction unit supplies logical address and storage unit requests from line 150 through priority logic 106 to the storage unit pipe. The output of the priority logic 106 is supplied to the T cycle operand address register 107 (TOAR). The T cycle operand address register 107 (TOAR) is used to access the translation lookaside buffer 108 (TLB) and tag memory 109. Also, the output of the T cycle operand address register 107 is supplied to the B cycle operand address register 110 (BOAR).

The output of the TLB 108 is supplied to TLB match logic 111 in parallel with the output of the T cycle operand address register 107. Similarly, the output of the tag memory 109 is supplied to tag match logic 112 in parallel with a segment of the TLB memory 108. The output of the tag match logic is supplied to TLB associativity selector 113 which is further enabled by the TLB match logic 111. The results of the tag match are stored in register 114.

In parallel, the B cycle operand address register 110 is used to access the buffer memory 115. The outputs of the buffer memory 115 are supplied to associativity selector 116 which is enabled by the results of the tag match from register 114. The output of the selector 116 is supplied through alignment logic 117 to operand word register 118 (OWR), and then to the execution unit. Also, the output of alignment logic 117 is supplied to the translation logic 140, which supports address translations used for logical and real addressing.

Similarly, the output of the buffer 115 is supplied to associativity select logic 119 and on to a data move out register 120 which is coupled to the system controller through a sequence of registers, including 130 and 131. The output of register 130 is connected to selector 132. The second input to selector 132 is a store queue 133. The output of selector 132 is supplied to the system controller through a path including register 131.

The output of the B cycle operand address register 110 is also supplied to the translation logic 140, and to an R cycle operand address register 121 which is connected to the system controller, and to the store ports 104, priority logic 100, and fetch ports 103. The outputs of the B cycle operand address register 110, R cycle operand address register 121 (ROAR), and store ports 104 are merged on line 146 to the Store-Fetch-Interlock (SFI) comparator 145.

Shown across the top of the figure are an indication of the pipeline stages: P for priority, A for address, T for TLB and tag access, B for buffer access, and R for results. In the P cycle, a port is selected by logic 100 for loading into register 105. In the A cycle, a request is loaded into the TOAR 107. In the T cycle, the TLB and tags are accessed, as described with reference to FIG. 3. In the B cycle, the cache buffer is accessed. In the R cycle, the results of the cache buffer access are posted to the E UNIT, the system controller and/or the translate logic.

As can be seen, the input data paths to the buffer 15 are not shown in the figure for simplicity. However, the data may be supplied from the execution unit across line 135 to the store queue 133 for a linestore operation. This data will constitute the pad byte which the host CPU desires to write into a line of mainstore memory using the linestore operation. This operation involves a linestore flow initiated by the instruction unit and selected through selector 106 into the pipeline. In this flow, the pad byte is loaded into the store queue 133, and the address of the linestore, together with the opcode for the linestore operation is loaded into the store ports 104. A store port state machine 136 maintains a queue of pending linestores in the store ports, and controls the store queue 33 for the purposes of executing the linestore operations.

Also associated with the storage unit pipeline is decode logic 137 for opcodes of operations flowing down the pipe. Relevant to the present invention, a system controller-to-storage unit opcode is received by the decoder 137. The decoder 137 during normal long move outs to main storage, enables or disables setting of the line lock 138 latch (LL) in the event the line is locked in use by the local processor in the system. For the linestore operation, the decoder 137 is responsive to a linestore restart opcode from the system controller to set a linestore retry mode latch 139 (LSR). Also, the decoder 137 resets the linestore retry mode latch 139 in response to a reply to an initial request, as described in more detail below. Selector 152 is controlled by the decoder 137 to select either the line locked latch 138 or the linestore retry mode latch 139 depending on the operation indicated by the opcode. The output of the selector 152 on line 141 becomes associated with the data of the read flow in the store queue 133, so that the operation is dropped by the system controller as involving invalid data.

FIG. 4 illustrates a more detailed functional block diagram of the system controller according to the present invention. The system controller includes a system for controlling access to data among the CPUs and other portions of the system, such as the service processor, the main storage unit, I/O processors, and the like. Thus, it includes an input priority logic 200 which receives requests from CPU 0 through CPU n (n=3 in the embodiment of FIG. 4). Other requestors to the system controller are also supplied as inputs to the priority logic 200, such as the service processor, I/O processors, and the like. Also, a move out queue bus 201 is supplied as an input to the priority logic 200. The output of the priority logic 200 is supplied on line 202 to the request ports 203 (RP) and to a write buffer 204. A remote system controller (in a system including a plurality of system controllers) is also coupled through line 205 to cross coupled request ports 206 (XC).

The request ports 203 and 206 are coupled to a plurality of servers, including a data integrity server 207 (DI), a move out server 208 (MO), a move in server 209 (MI), a move out queue server 210 (MOQ), a key server 211, and a mainstore server 212 (MS). The remote system controller has access only to the data integrity server 207, move in server 209, and move out queue server 210. The write buffer 204 has access only to the mainstore server 212 and is dedicated for writes to mainstore, including linestores.

The move out queue server 210 includes a move out queue add server for adding new lines to the move out queue 232, and a move out queue search server for maintaining move out queue tags 218 and a look table 218-L used by the I/O units or service processor.

The data integrity server 207 is coupled to the TAG2 logic 213. The TAG2 logic includes copies of the tags from all of the storage units for the CPUs of the local system CPUs of the cross-coupled system are not served by the local TAG2 logic 213. Thus, data integrity and cache consistency operations are carried out using the data integrity server 207 and the TAG2 logic 213. Requests for data from the data integrity server 207, move out server 208, and move in server 209, are supplied through selector 214 to the interface controllers for 215-0 though 215-3 for each of the CPUs. Also, requests from move out server 208 and move in server 209 are supplied through selector 216 through a shared interface controller 217 to the other requestors in the system, such as service processors, I/O processors, and the like.

The move out queue server 210 is coupled to the move out queue tags 218 and the move out queue transfer controller 219. Ibus requests from the move out queue transfer controller 219 are supplied on line 201 to the select logic 200. Linestore store requests from controller 219 include an address and a linestore tag bit from the move out queue tag 218.

The key server 211 drives local key array 220 and is coupled to a remote key array. The local key array 220 (or remote key array) is used to provide storage keys to the CPUs and other requestors in the system.

The mainstore server 212 supplies addresses to the local mainstore unit 221, and to a remote mainstore facility if present in the system.

The data paths for the system controller are shown in the bottom half of the figure. The output of the local mainstore unit is supplied on line 222 to error correction code ECC logic 223. The output of the ECC logic 223 is supplied to a switch 224. Other inputs to the switch 224 include the output of ECC logic 225 which is supplied from the remote mainstore unit, the output of the selector 226 which is used to supply data integrity move out data from the CPUs, and output of the selector 227 which is used to supply swap move out data and linestore data from the CPUs in the system and store data from the various units in the system. Linestore "pad" bytes are provided by the S-unit in 16 byte quad words through selector 227. Finally, the switch 224 receives remote bypass data across line 228. The output of the switch 224 supplied to the fetch and store buffers 229-0 through 229-7. The data in the fetch and store buffers is supplied through switch 230. The switch 224 also supplies bypass path 231 to a remote system controller.

The output of the switch 230 supplies move out queue buffers 232 with associated ECC logic 233, the move in data paths to the respective CPUs, and the fetch data paths to the variety of fetch data requestors. Move out queue add server in server 210 replicates the quad word received from the S-unit to a quarter line in the move out queue 232. The output of the move out queue ECC logic 233 is supplied on line 234 through error checking correcting logic 235 to the remote mainstore unit, and through ECC logic 236 to the local mainstore unit. Also, the data on line 234 is supplied as an input to the switch 224.

In a linestore operation, the system controller (SC) is responsive to a linestore request from a storage unit (SU) in a CPU in a first pass to perform data integrity operations using the data integrity server 207, the move out queue search server in move out queue server 210, and the move out server 208. If the data integrity searches do not detect a locked line or other status, then the move out server 208 will issue a reply to the requesting CPU through one of ports 215-0 through 215-3.

The initial request flag (init-flag) is used by the move out server in the formulation of its reply opcode. Although the init-flag could be conveyed using a wire, the system described incorporates the init-flag into the SU-SC and SC-SU opcodes. SU-SC opcodes include linestore requests and linestore-init requests. SC-SU opcodes include linestore read replies, linestore read-init replies, linestore restart replies, and linestore restart-init replies. This implementation eliminates the need to pass the store port ID between the SU-SC and SC-SU providing a significant saving of I/O.

In the linestore read flow, data is received through the selector 227 to the system data switch as shown in FIG. 4 under control of the move out queue server. It is selected into the port data buffers 229-0 through 229-7, as appropriate. The data for the linestore flow thus is selected by selector 227 into switch 224. From switch 224, it is loaded into a port data buffer 229-0 through 229-7. Out of the port data buffer, switch 230 routes the data into the move out queue 232. The pad data is then moved across line 234 into the local mainstore unit 221 under control of the move out queue transfer controller 219.

A series of linestores begins with a request from the instruction unit. After the store port holding this first linestore becomes top-of-queue (TOQ), a linestore init request is issued to the SC. The SU sends the init-flag with a linestore request if there are no other outstanding linestore requests to the SC, as indicated by the state machines associated with each store port. Sending the init-flag on the first linestore in a series in this manner assures that the linestore retry mode latch is initialized in the inactive state.

The SU linestore retry mode latch is set when the SC sends a linestore restart, with or without the init-flag active. When active, the linestore retry mode latch indicates that the serial processing of linestores was disturbed, due to the line being locked by a processor or other reasons, and that subsequent linestore reads from the system controller must be cancelled to prevent out of order storing. The SC maintains no state information that a previous linestore has failed and relies on the SU to cancel linestore reads when appropriate. Linestore request flows present in the SU pipe when the linestore retry mode is entered do not have to be cancelled. If accepted by the SC, the SU will suppress the linestore read. The storage unit has the capability to suppress linestore reads (or move-outs) by signaling "line locked" on line 151 of FIG. 3 as a handshake to the system controller.

Upon entering linestore retry mode, the SU re-sends the failed linestore. This TOQ linestore is now "first" in a series since the previous series was broken and the store port state machines have been reset to the initial linestore state. The SU issues a linestore init request to the SC. In the meantime, all linestore reads from the SC are suppressed by the SU by signalling "line locked".

If the SC discovers that the requested line is still locked, a linestore restart-init is returned. The linestore retry mode latch is set again (although previously set) and events continue as previously described until the SC finds that the requested TOQ linestore, which is indicated by the linestore init request opcode, is no longer locked. The SC responds with a linestore read-init.

The linestore read-init from the SC resets the SU linestore retry mode latch and allows the sequential processing of linestores to resume.

III. Store Port State Machine and Linestore Flows (FIGS. 5–8)

Figures 5, 6:
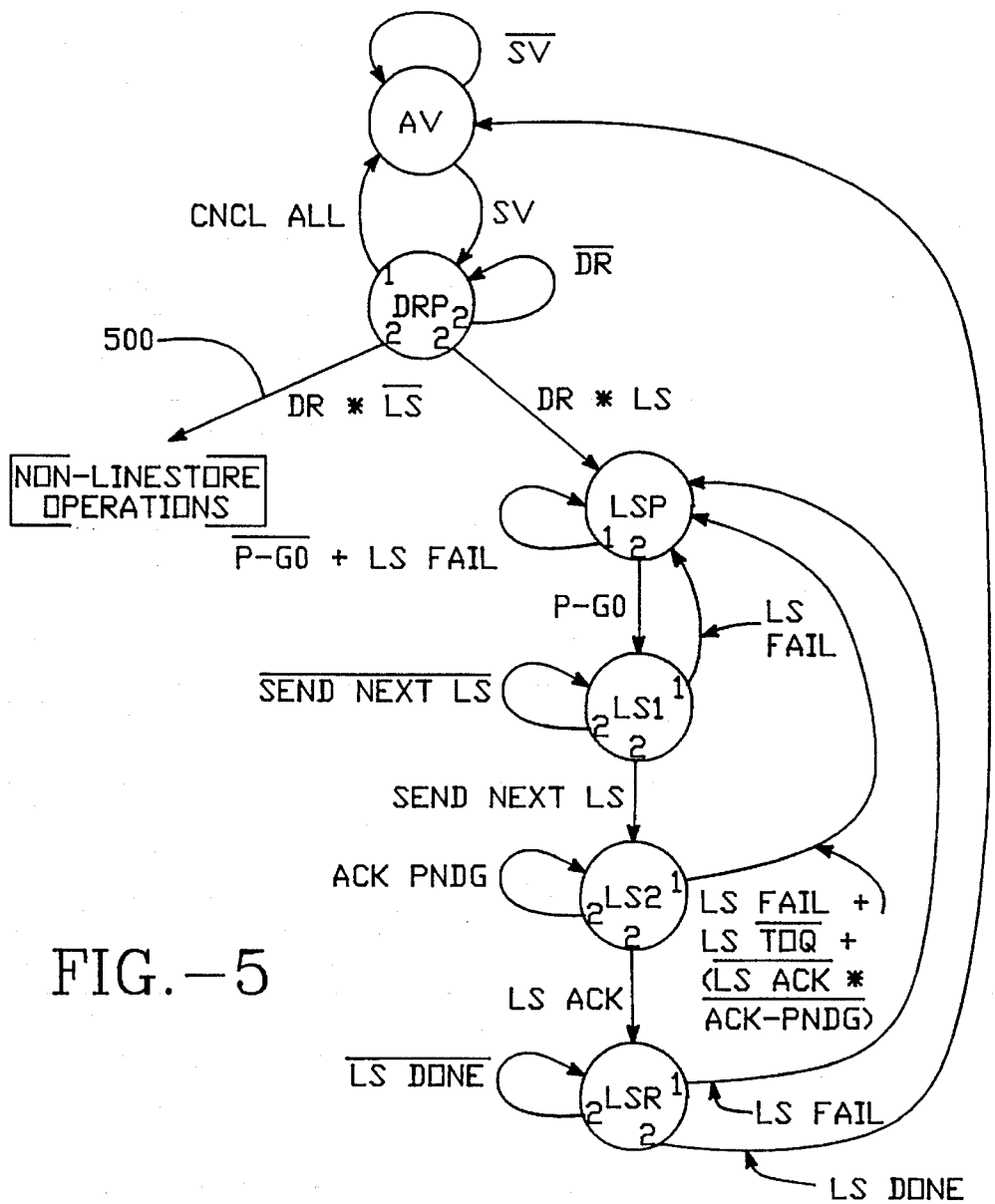
FIG. 5 is a state diagram for the state machine of the store ports which issue the linestore requests according to the present invention.
FIG. 6 is a pipeline flow diagram illustrating the linestore operation.
Figure 7:
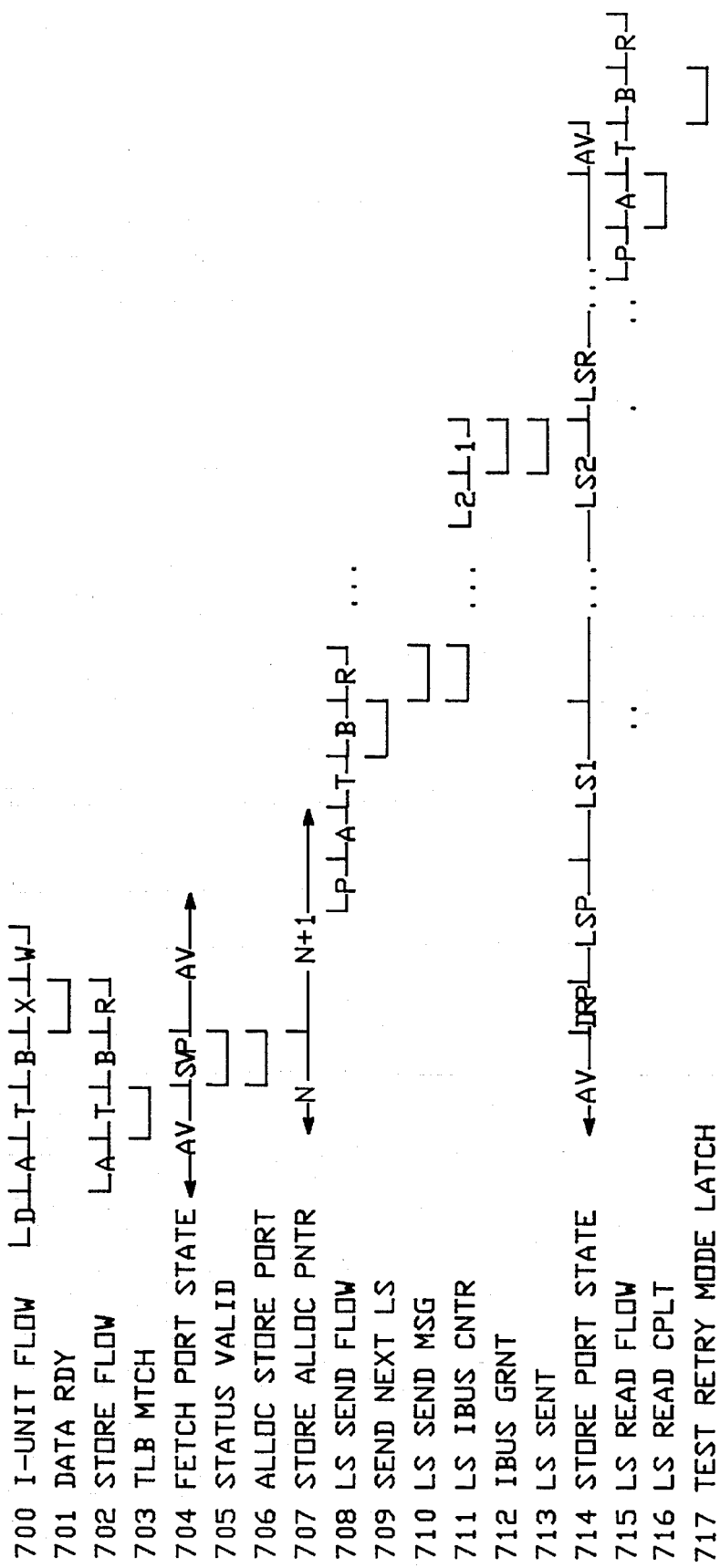
FIG. 7 is a pipeline flow diagram further illustrating the linestore operation.

FIGS. 5–7 illustrate the store port state machine that is involved in the linestore operations, and describe the linestore flows in the storage unit for a better understanding of the present invention.

The linestore operation as described herein are equivalent to the move character long instruction in the IBM 370 Principles of Operation standard instruction set.

FIG. 5 is a state diagram for the store port in the storage unit shown in FIG. 3. As shown in FIG. 5, the store port state machine, which is associated with each store port 104 and its corresponding location in the store queue 133, includes six states which are relevant to the linestore operation, including the available (AV) state, the data ready pending (DRP) state, the linestore pending (LSP) state, the first linestore send (LS1) state, the second linestore send (LS2) state, and the linestore read (LSR) state.

The algorithm completion status of each store request is tracked by the store port state machine. The store request is tracked from the time status valid is posted for the request until the store data for the case of linestores has been transferred to the SC. (See FIG. 7.)

When a store request from the I-Unit is allocated a store port in the B cycle of an I-Unit flow, status valid is posted to the I-Unit and the allocated store port transitions from the available (AV) state to the data ready pending (DRP) state. While in the DRP state, a store port is still subject to cancellation from the I-Unit.

From the DRP state, there are two major state-transition branches; one for linestores to the LSP state and one (generally 500) for all other types of stores. When a store port becomes the oldest request in the DRP state (i.e., it becomes DRP TOQ), it transitions to the next appropriate state upon receiving X STORE DATA READY and X RELEASE from the I-Unit. Subsequent to this transition, the store port cannot be cancelled. However, it can be suppressed.

The linestore path leads from the DRP state to the linestore pending (LSP) state. The DRP to LSP transition occurs when the I-Unit asserts X DATA READY and X RELEASE for linestore flows. A sequence of linestores LS#1 (line 600) and LS#2 (line 602) is shown in FIG. 6, from the LSP state to the LSR state for each (lines 601 and 603, respectively). From the LSP state, if the port is at the top of the LSP queue and there is no store port in LS1 state and no previous port is in the process of sending a set change bit SCHB message to the SC, P-cycle priority will eventually be granted (line 604) and the P-GO signal asserted. As a consequence of the resulting flow shown at line 600, the store port will:

1) Send a linestore opcode to the SC (R cycle of line 600) (unless the linestore is suppressed).

2) Start the grant-latency counter (line 606) decrementing from an initial value that is dependent on system configuration in the A cycle of line 600.

3) Transition to the first linestore send (LS1) state ("1" in line 601).

4) Start an IBUS grant counter after the linestore opcode is sent (line 607).

The store port will remain in the LS1 state a prescribed number of cycles as controlled by the latency counter line 606. After the latency counter has counted down to zero, the "SEND NEXT LS" signal is asserted and the store port transitions to the second linestore send (LS2) state ("2" in line 601). At the same time, it is possible that another store port be granted access into the pipe (line 605) to execute a flow (line 602) that will send another opcode to the SC. The purpose of the LS1 state is to ensure that the second in time store port does not receive priority into the pipe any sooner than this juncture after the latency counter of line 606 times out.

While in LS1 or LS2, if a previous linestore transitions from the LSR state back to the LSP state due to a linestore failure (LS FAIL), the store port will also transition back to the LSP state.

In the LS2 state, the store port continues to wait (ACK-PNDG) for the SC IBUS-grant counter to decrement (line 607). As it decrements past one, the IBUS grant signal from the SC is interrogated (line 608). It is at this precise moment in time that the SC will either acknowledge (LSACK) the linestore request that was sent back in LSP state or not acknowledge it. (The purpose of the IBUS-grant counter is to ensure the store port tests the IBUS grant acknowledge signal at the right time). If IBUS grant is not asserted, the store port returns to the LSP state (-LS ACK*-ACK-PNDG). Also, if another store port is about to send an opcode to the SC, (for example, it is in LSP state and has been granted priority into the pipe) the opcode is blocked and not sent. If SC grant is asserted when tested, line 608, the store port advances to the linestore read (LSR) state ("R" in line 601).

As can be seen in FIG. 6, the second linestore will flow as shown in line 602 and transition among the store port states as shown in line 603. The second linestore requests priority in line 605 on transition to the LS2 state. The latency counter is restarted as shown in line 606. The IBUS grant counter is started after the linestore opcode is sent (line 607), and the test occurs (line 608) on transition to the LSR state.

It is possible for a store port to make it to LS2 without being TOQ (LS-TOQ); the previous port transitions from LS2 to LSP due to a negative acknowledgement thus allowing an LS1 to LS2 transition of a succeeding port which is lower in the queue than the one just transitioned to LSP. Therefore, a non-TOQ store port in LS2 always transitions back to LSP without interrogating SC grant.

Once in the LSR state, the store port waits for an SC linestore read flow. (This will not occur for suppressed store ports since the SC never received the linestore message). The LS read flow indicates the success of the SC operation. If the SC operation is successful in the LSR state (LS DONE) or if the store port is suppressed, the store port transitions to the AV state.

If the SC operation was unsuccessful (LS FAIL) (due to a locked line, error, etc.), all the store ports in the LS1, LS2, and LSR states return to the LSP state for a retry operation. During a linestore retry, the retried store port is placed TOQ and no store port makes it out of LSP until the retried store port completes its retry.

The pipeline flow diagram for the linestore operation is shown in FIG. 7. The linestore operation is initiated by an instruction unit flow (line 700) which supplies the pad byte to the store queue in the execution unit upon issuing of the data ready signal (line 701) in the X cycle. The store flow associated with the I-unit flow is shown in line 702. It is granted priority to the storage unit pipeline for writing the pad byte to the store queue. As can be seen, a TLB match occurs in the T cycle of the store flow (line 703) to provide the physical address and permit exception checking. The algorithm allocates a fetch port in the B cycle (line 704). Upon issuance of status valid (line 705) in the B cycle, a store port is located (line 706). The fetch port then transitions to an available state. A store port allocation pointer increments upon allocation of the store port as shown in line 707 to preserve the order of linestore requests in the store port queue. At some time later, a linestore send flow of the storage unit is granted priority (line 708). This linestore send flow corresponds to the linestore flows in lines 600 and 602 of FIG. 6.

The store port state progression is shown in line 714. As can be seen, prior to allocation of the store port, the store port is in the available state. It then transitions upon allocation to the data ready pending state, and then to linestore pending. During the linestore pending state, the linestore send flow is initiated in line 708. Upon granting priority in the A cycle of the linestore send flow of line 708, the store port transitions to the first linestore state.

Upon expiration of the first linestore state latency counter which corresponds to the latency counter of line 606 in FIG. 6, the send next linestore signal is asserted (line 709). In the figure, the alignment with the B cycle of the linestore send flow in line 708 is accidental, done so that the flow will fit on the page. The relationship between the transition from linestore 1 to linestore 2 is more clearly shown in FIG. 6.

In the R cycle of the linestore send flow, the linestore send message is issued (line 710). The linestore IBUS grant counter, which corresponds to the grant counter of line 607 of FIG. 6 is then started (line 711). Upon timeout of the counter in line 711, and IBUS grant signal in line 712 is tested, the linestore sent signal is issued as shown at line 713 if the IBUS grant is successful. Upon linestore sent in line 713, the store port transitions to the linestore read state. The linestore read state occurs some cycles later as shown in line 715. In the A cycle, a linestore read complete is issued as shown in line 716, and the linestore port transitions to the available state. Before the B cycle of a linestore read flow, the opcode issued by the system controller to initiate the linestore read is decoded to indicate whether it is a linestore read from an initial linestore request, or a normal linestore read. If it is a read from an initial linestore request, then the linestore retry mode latch is reset before the B cycle of the read flow.

In the B cycle of the linestore read flow, the logic tests the linestore retry mode latch (line 717). If in linestore retry mode, the data supplied in the linestore read flow to the system controller is marked locked. If not, the data will be marked valid as appropriate and the linestore read will succeed.

In the R cycle of a successful linestore read flow, the pad byte is moved from the store queue to the system controller through the moveout interface as shown in FIG. 3.

CPU linestores are special case operations that arise from page clear move char long instructions (MVCLs) with zero-length first operands. During a linestore, the requesting SU will send a linestore request to the SC. This request has four flavors which are conveyed in the opcode. The flavors are the decoded values of two logical flags: "Init", and "SRCB". When the opcode indicates SRCB, the key server (KS) will set the reference and change bits if the linestore data is added to the MOQ. When the linestore opcode from the SU indicates "Init", any response sent by the SC will convey the "init" flag in the response opcode. Thus, from the SU's point of view, a total of one flow is necessary to complete a linestore. The SC side timing diagram of this operation is shown in FIG. 8.

A storage unit linestore send flow is represented in line 800. CPU linestores are somewhat of a hybrid to the Ibus because they are DIEC-specific requests (i.e., the DIEC specified by PA bits 21:24 must not be busy) but the SU must be informed, via Ibus grant (line 801), that the SC has accepted the request. This helps the SU guarantee that the linestore requests are sent in order. At the same time, the request reaches the SC port (line 802).

The first servers that start working on the port during a linestore are the DI (line 803) and MOQ search (line 805) servers. This operation requires no service from the mainstore request server (line 808). The MOQ search server checks for any locked lines, and does not find any in this example. The DI server goes through its usual TAG2 search, and discovers that a SMO is necessary (line 804). The MO server cannot initiate the interface request to the CPU interface controller for a "LINESTORE READ (INIT/NON-INIT)" flow until the DI server has determined that all move-outs have completed successfully and the MOQ search server has completed the lock table search.

For data integrity purposes, a LMO, if necessary, has to be completed before the linestore read can be sent. To guarantee that all processors see the linestores done in order. DI move-out data is queued in the fetch port data buffer and is added to the MOQ if the linestore cannot complete. This may occur when the requesting SU is in linestore retry mode and suppressed the linestore by posting "line locked" on the linestore read's MO status. If a DI LMO encounters line locked MO status due to an interlocked update or pending "set change bit" operation, the MO server must return a "LINESTORE RESTART (INIT/NON-INIT)" opcode to the SU indicating the linestore "stream" must be retried. The SU enters linestore retry mode (if not in that mode already). SU linestore retry mode causes the TOQ and subsequent linestores to be re-sent and causes the suppression of subsequent LS READs by asserting MO status "line locked". A LINESTORE READ INIT resets the SU linestore retry mode after the SU has gotten responses for all outstanding linestore requests in linestore retry mode and reissued the TOQ linestore request with the INIT flag active in the request opcode to the SC.

Finally, the MO server requests CPU interface priority for the LS READ (line 806), and when granted, the data is transferred to the SDS port data buffer (line 807) as indicated by the absence of "line locked" MO status on the LS READ. As the data arrives at the SDS port data buffer, the MOQ add server will recognize the presence of a single quad word (instead of the full line) by examining the opcode, and set the MOQ tag linestore bit accordingly. When adding the linestore data to the MOQ, the QW is actually written twice and occupies a quarterline (QL) (line 810). The data will be transferred to the mainstore (by the MOQ transfer controller) as a single QL, where it will be padded to its full length by clocking all DIR QLs simultaneously (line 811). Finally, a mainstore write is requested (line 812).

As can be seen, the present invention provides for maintaining the order of pending linestores in the event that one of the linestores is unsuccessful and a restart response is issued by the system controller. Because linestores may be in various stages of completion when the retry mode latch is active, it is necessary to catch all of the intermediate linestores, reset them to a pending state, and retry the linestore which resulted in the restart flow. After the retried linestore is successful, then the succeeding linestores are allowed to complete.

The present invention does so by picking a spot in the pipeline involved in the execution of the linestores through the storage unit and system controller, and marking as invalid any data which passes through that spot during a retry mode. The retry mode is set and reset by the use of initial linestore flags which are carried by the retried linestore operations. Thus, a simple and effective manner of purging out of order linestores has been achieved.

Although in the embodiment described, the point in the pipeline which was selected for purging out of order linestores occurs in the storage unit pipeline, it may as well be located at other positions in the flow of the operation, such as within the system controller, as suits the needs of a particular design.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A retry request control system in a data processing system, said data processing system having a pipeline architecture where the pipeline processes a plurality of overlapping pipeline flows simultaneously, said control system comprising:

first means in a requesting unit within said data processing system for issuing a request during a request flow of said pipeline and for identifying said request as an initial request if no pending requests remain in the pipeline or awaiting a reply from a previously issued request or otherwise as a non initial request;

second means in a control unit within said data processing system for issuing during a reply flow of said pipeline a restart pipeline reply if a request issued during said request flow fails or otherwise a successful reply;

third means in said requesting unit in response to said restart pipeline for causing said request which failed to be reissued by said first means as an initial request;

fourth means in said requesting unit for inhibiting the storage of the results of all requests issued by said first means between the time said first means first issued said failed request and the time said first means reissues said failed request as an initial request; and said requesting unit preserving the order of the requests issued by said requesting unit when a failed request issued by said requesting unit is retried by said requesting unit independently of said control unit.

2. The control system of claim 1, wherein said first means indicates a request to said control unit as an initial request by issuing in a request flow of the pipeline an initial request opcode in said request for initial requests and a non initial request opcode within said non initial requests.

3. The control system of claim 2, wherein said second means indicates to said requesting unit a successful reply to an initial request by issuing in a reply flow of said pipeline an initial reply opcode within said reply and a non initial reply opcode within said reply to said non initial requests.

4. The control system of claim 3, wherein said second means indicates to said requesting unit a restart pipeline reply to an initial request by issuing during a reply flow of said pipeline an initial restart pipeline reply opcode within said reply and a non initial restart pipeline reply opcode within said reply in response to non initial requests.

5. The control system of claim 4, wherein said third means in response to either said initial restart pipeline opcode or said non initial restart pipeline opcode being detected during a reply flow of said pipeline causes said first means to reissue all requests beginning with said request which was indicated as failed by said reply flow having either said initial restart pipeline opcode or said non initial restart pipeline opcode in said reply and to have said first means indicate said request which was indicated as failed by said reply flow as an initial request.

6. The control system of claim 5, wherein said fourth means includes a latch which is set by either said initial restart pipeline opcode or said non initial restart pipeline opcode being detected during a reply flow of said pipeline and which is reset by said initial reply opcode being detected during a reply flow of said pipeline, said latch when set inhibits the storing of data during a reply flow in response to a request.

7. The control system of claim 1, wherein said first means indicates a request to said control unit as an initial request by sending a request signal having a first value for an initial request when said initial request is issued in a request flow of the pipeline and a second value for a non initial request when said non initial request is issued in a request flow of the pipeline.

8. The control system of claim 7, wherein said second means indicates a reply to said requesting unit as a successful reply by sending a reply signal having a first value when an initial reply is issued in a reply flow of the pipeline and a second value when said non initial reply is issued in a reply flow of the pipeline.

9. The control system of claim 8, wherein said second means indicates a reply to said requesting unit as a failed reply by sending a reply signal having a third value when an initial reply is issued in a reply flow of the pipeline and a fourth value when said non initial reply is issued in a reply flow of the pipeline.

10. The control system of claim 9, wherein said third means in response to either said third or fourth values of said reply signal being detected during a reply flow of said pipeline causes said first means to reissue all requests beginning with said request which was indicated as failed by said third or fourth value of said reply during a reply flow and to have said first means indicate said request which was indicated as failed by said third or fourth values of said reply signal during said reply flow as an initial request.

11. The control system of claim 10, wherein said fourth means includes a latch which is set by either said third or fourth values of said reply signal being detected during a reply flow of said pipeline and which is reset by said first value of said reply signal being detected during a reply flow of said pipeline, said latch when set inhibits the storing of data during a reply flow in response to a request issued to the pipeline by said first means.

* * * * *